United States Patent [19]

Ueda et al.

[11] 4,260,232

[45] * Apr. 7, 1981

[54] CAMERA STRUCTURE FOR SINGLE LENS REFLEX CAMERA

[75] Inventors: Hiroshi Ueda, Nara; Takayoshi Miyamoto; Masatake Niwa, both of Sakai, all of Japan

[73] Assignee: Minolta Camera Kabushiki Kaisha, Osaka, Japan

[*] Notice: The portion of the term of this patent subsequent to Aug. 7, 1996, has been disclaimed.

[21] Appl. No.: 26,747

[22] Filed: Apr. 3, 1979

Related U.S. Application Data

[63] Continuation of Ser. No. 862,967, Dec. 21, 1977, Pat. No. 4,163,612.

[51] Int. Cl.³ .................. G03B 19/12; G03B 17/02
[52] U.S. Cl. ............................. 354/152; 354/288
[58] Field of Search ............ 354/152, 288, 150, 151, 354/153–156, 202, 219, 226, 235, 234, 246, 289, 60, 204

[56] References Cited

U.S. PATENT DOCUMENTS

| | | | |
|---|---|---|---|
| 3,636,846 | 1/1972 | Singer | 354/153 |
| 3,682,060 | 8/1972 | Furuta | 354/152 X |
| 3,693,523 | 9/1972 | Tenkumo et al. | 354/152 |
| 3,913,114 | 10/1975 | Taguchi et al. | 354/204 |
| 3,950,772 | 4/1976 | Nakagawa et al. | 354/234 |
| 3,996,593 | 12/1976 | Uno et al. | 354/60 L X |
| 4,062,028 | 12/1977 | Tezuka et al. | 354/152 |
| 4,067,032 | 1/1978 | Yoshikawa et al. | 354/219 X |
| 4,079,396 | 3/1978 | Iura et al. | 354/152 |
| 4,163,128 | 8/1979 | Ueda et al. | 354/152 |

FOREIGN PATENT DOCUMENTS

| | | | |
|---|---|---|---|
| 2131881 | 12/1972 | Fed. Rep. of Germany | 354/152 |
| 370958 | 9/1963 | Switzerland | 354/152 |

*Primary Examiner*—Donald A. Griffin
*Attorney, Agent, or Firm*—Watson, Cole, Grindle & Watson

[57] ABSTRACT

In a single lens reflex camera including a camera body provided with a film receptacle, a film transporting mechanism and an operating member for effecting film advancing and shutter cocking; a shutter block in which shutter blades or the like and shutter actuating and controlling mechanism are associated as a unit on a base plate; and a front plate formed with a mount for the camera objective lens and having attached thereto a mirror box which is provided with a reflex mirror, a mirror driving mechanism and a diaphragm driving mechanism, the front plate assembly to which the shutter block is coupled is attached to the camera body, whereby interconnection between the shutter mechanism, the mirror and the diaphragm mechanism is improved.

5 Claims, 6 Drawing Figures

CAMERA STRUCTURE FOR SINGLE LENS REFLEX CAMERA

This is a continuation of application Ser. No. 862,967 filed Dec. 21, 1977, which is now U.S. Pat. No. 4,163,612 issued Aug. 7, 1979.

BACKGROUND OF THE INVENTION

1. Field of the Invention

The present invention relates to a camera body structure for single lens reflex cameras, and more particularly pertains to such camera body structure which employs a unitized shutter block that is preassembled in a unit or block before it is coupled with the remaining parts of the camera body.

2. Description of the Prior Arts

The unitized shutter block, in which shutter blades and driving mechanism therefor are mounted on a base plate to be assembled in a camera as a unit or block, has recently been adopted in many single lens reflex cameras. This is because such unitized shutter device can be dealt with as a block upon assemblage of cameras and may be adjusted or calibrated, for example, with respect to its opertion, relative position of its particular parts, shutter speed, etc., before the device is associated in a camera body so that the single lens reflex cameras employing such unitized shutter block are suitable for mass produdction with the adjusting process for such cameras being facilitated.

In the conventional single lens reflex cameras employing the unitized shutter device, a front plate which has a mount for the interchangeable lens and to which the mirror box including the reflex mirror and diaphragm driving mechanism has been fixed, is attached to the main camera body, after the shutter block is mounted on a main camera body including a film receptacle, film driving mechanism and shutter cocking mechanism. Accordingly, due to accumulation of errors occurring, upon coupling, at relative positions between the shutter block and the main camera body, between the front plate and the main camera body, and between the mirror box and the front plate, the relative position of the mirror box to the shutter block is liable to deviate from the desired position resulting in imperfect interconnection between the shutter driving mechanism in the unitized shutter block, and the diaphragm and the mirror driving mechanism on the mirror box.

It may be possible in such a case to adjust relating mechanisms for perfecting the interconnection. With the conventional single lens reflex cameras, operation and examination, as to interconnections and operations, of their shutter, reflex mirror and diaphragm driving mechnisms are available only after the shutter block, mirror box and front plate are all assembled in a camera body. However, the examination and adjustment of their mechanism are in fact difficult in the conventional cameras, because portions or parts to be adjusted are likely to be blocked by the other parts or mechanism in the assembled condition. Therefore, in such conventional cameras, safety tolerance and space are provided between the shutter driving mechanism and the diaphragm and mirror driving mechanism, taking into account the accumulated error, so that the difficult adjustment may not be required. As a result, interconnected members are necessarily required to move greatly and the drive force therefor will also be large, thereby increasing the force for shutter cocking and noise upon the operation of the members, as well as shortening the lifetime of the members. Additionally, the safety space itself will be one of the factors against providing compactness of the camera body.

SUMMARY OF THE INVENTION

Accordingly, the primary object of the present invention is to provide an improved camera body structure for a single lens reflex camera employing the unitized shutter block.

Another object of the present invention is to provide such camera body structure which requires no extra space for the interconnection between the shutter mechanism and the mirror and the diaphragm driving mechanism.

Still another object of the present invention is to provide a single lens reflex camera which is compact in size and reliable with respect to its preciseness of operation and its durableness with the noise of operation and the force for shutter cocking being minimized.

A further object of the present invention is to provide a single lens reflex camera in which the accuracy of the relative position between the unitized shutter block and the mirror box is improved to eliminate the above explained disadvantages of the conventional cameras, with the adjustment of the interconnection between shutter mechanism and mirror-diaphragm mechnism being minimized and available, if required, before they are assembled in a camera.

According to a feature of the present invention, the front plate having the mount for the interchangeable lens is utilized not only as a base plate for the mirror box but also as a base for attaching the unitized shutter block thereto. It is to be understood that the mirror box may be constructed integrally with the front plate or may be fixed to the same. Additionally, the main camera body may be provided with a film receptacle and film driving or advancing mechanism including a wind-up lever, a film spool, a sprocket, gear train and so on.

In the single lens reflex camera according to the present invention, the main camera body includes a film transport and shutter cocking mechanism, while a front plate provided with a mirror box fixed thereto or formed integrally therewith, has a mirror and diaphragm mechanism mounted thereon and is to be attached to the camera body. Moreover, the unitized shutter block is also mounted on the front plate and not directly on the camera body. Thus, the error in the relative position of the unitized shutter block and the mirror box will be small in comparison with the conventional camera since it depends on tolerances for the couplings of the unitized shutter block and the mirror box respectively with the front plate, thereby attaining a good interconnection between the shutter drive mechanism in the shutter block and the mirror and diaphragm driving mechanism on the mirror box. In addition, the mechanism may be ascertained or examined and adjustment may be carried out, if necessary, before assembling them in the camera body. Thus, the extra safety space required for the conventional camera is unnecessary, thereby making the camera free from the problems due to the safety space.

According to the preferred embodiment of the invention, the front plate may be formed with the view finder supporting portion which supports a focusing plate and a pentagonal prism. In this case, the unitized shutter block may be fixed to the rear surface of that supporting portion in part and to the rear surface or the back of the front plate in another part. Besides, it may be possible to mount the shutter block on the mirror box which is to be interposed between the front plate and the shutter block. However, such construction requires a ruggedly constructed mirror box which is unfavourable for the compactness and lightness of the camera body. However, the structure wherein the shutter block is fastened to the front plate directly and to the view finder supporting portion, allows the mirror box to be made of thin metal plate, thereby enabling further compactness of the camera.

According to another aspect of the embodiment of the present invention, on the mirror box is arranged an exposure system including a shutter speed setting device, a film sensitivity setting device, a light measuring circuit, an exposure control circuit, a release mechanism, etc., whereby the exposure operation may be checked easily before the system is assembled in the camera.

According to a further aspect of the embodiment, the release mechanism may be of the electromagnetic type including an actuating member, permanent magnet means for restraining the actuating member at a nonoperative position thereof, and an electromagnetic coil for offsetting the magnetic power of the electromagnet to allow the actuating member to move to its operative position where it initiates aperture of the mirror and diaphragm. The actuating member may be returned to its nonoperative position by the mirror diaphragm returning mechanism. With this construction, not only the release mechanism is operable before it is incorporated in the camera body, but also the electromagnetic release mechanism may be arranged adjacent to the returning mechanism without an intermediate member.

In still a further aspect of the embodiment according to the present invention, a space adjacent to the film cartridge receiving chamber at the bottom of the main camera body may be utilized for accommodating a part of the electric circuit assembly such that a recess is formed at the front part of the walls defining a space in which the electric conducting or connecting means, such as a printed circuit of flexible synthetic resin film, extends through the recess from the front of the camera body to the part of the electric circuit. This structure makes it easy to couple and decouple the front plate with and from the main camera body, with the part of the electric circuit assembly being connected through the printed circuit conductor means to the other part on the mirror box.

These and other objects, features and advantages of the invention will become more apparent upon a reading of the following detailed specification and drawing in which:

BRIEF DESCRIPTION OF THE DRAWING

FIG. 6 is a fragmentary bottom view of the camera body.

The accompanying FIGS. 1 to 6 show a preferred embodiment of the present invention and through the drawings, the same member is referred to with the same reference numeral.

Figure 2:
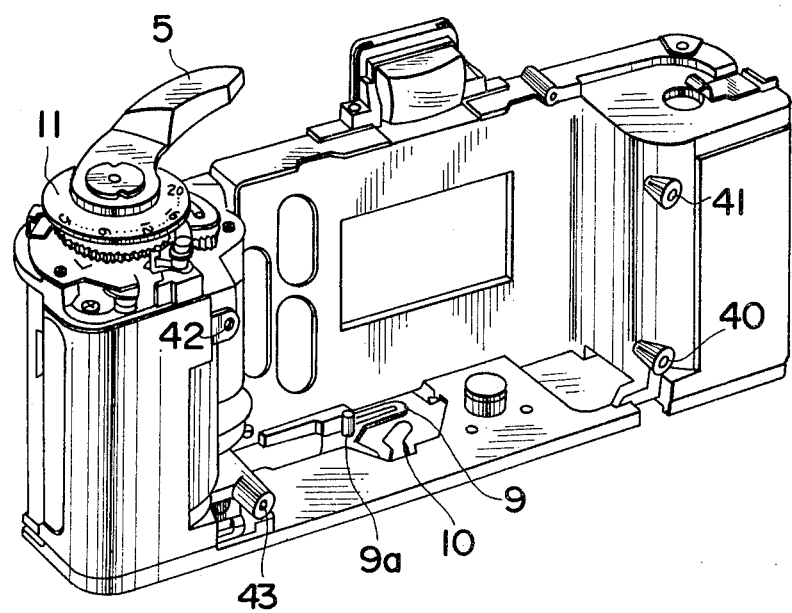
FIG. 2 is a perspective view of the camera body of FIG. 1.
Figure 3:
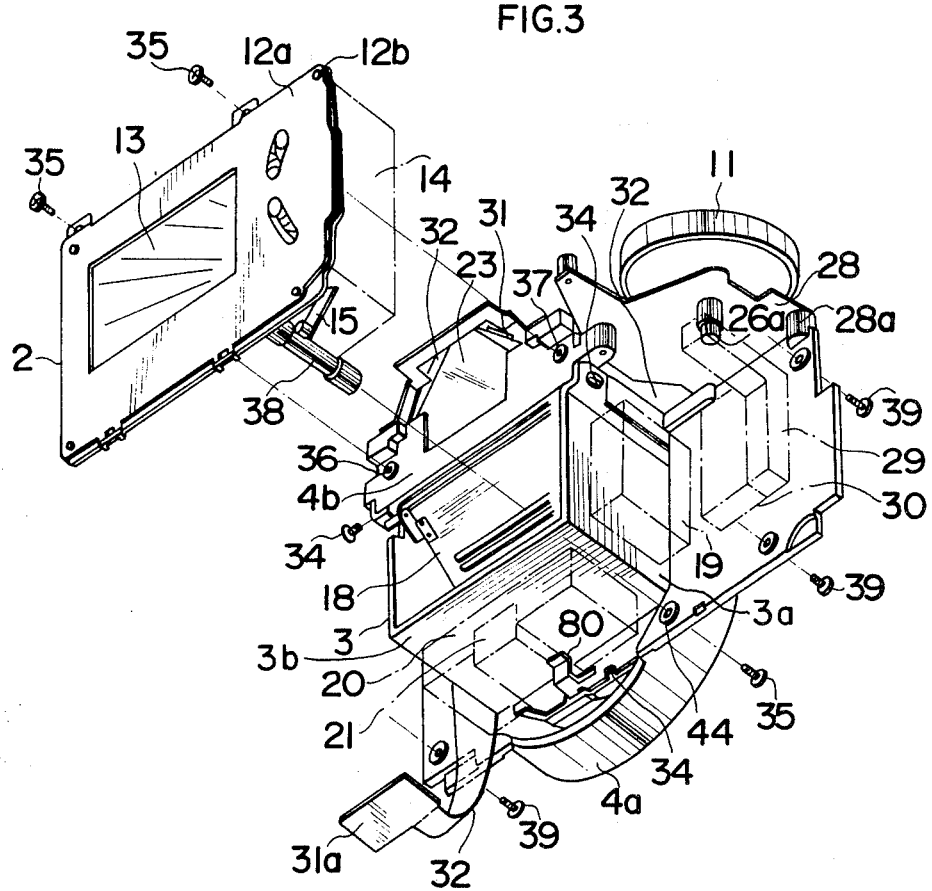
FIG. 3 is an exploded perspective view of the main part of the present invention.

At the outset, the arrangement and construction will be explained with reference to FIGS. 1 to 3.

Main camera body 1 may be made of aluminum diecast or plastic material. Unitized shutter block 2 is to be attached to front plate 4 which is also made of aluminum diecast and to which is fixed mirror box 3 formed of thin metal plate of about 1 mm in thickness.

Camera body 1 is provided, in the known manner, with wind up lever 5, film spool 6, sprocket 7, a film advancing mechanism including gear train (not shown), a cocking mechanism including cocking levers 9 and 10, and film counter 11. Thus, when wind up lever 5 is operated, film spool 6 and sprocket 7 are rotated through the gear train, while cocking lever 9 moves to the left and lever 10 moves to the right for cocking or charging the shutter driving mechanism, the mirror and the diaphragm driving mechanism.

Unitized shutter block 2 is provided, on its base plates 12a and 12b, with a plurality of shutter blades 13 and shutter driving mechanism 14 for driving the shutter blades 13. Shutter drive mechanism 14 includes shutter charge member 15 engageable with a pin 9a on the cocking lever 9 to be driven thereby, shutter restraining member 16 interlockable with the driving mechanism for the mirror and the diaphragm, and signal member 17 actuatable upon completion of the exposure, i.e. the closure of shutter. (see FIG. 4)

Mirror box 3 contains therein reflex mirror 18 for directing light from the scene to be photographed to a viewfinder optical system as is well known in the art. On one side wall 3a of the mirror box 3 is arranged the mirror driving mechanism 19 as shown in detail in FIG. 4. At the bottom 3b of the mirror box 3 is arranged diaphragm driving mechanism 20 which will be explained hereinafter with reference to FIG. 5. Electromagnetic release device 21 is also disposed at the bottom 3b of the mirror box 3.

Front plate 4 is formed, at its front surface, with mount 4a for an interchangeable lens (not shown), and at the back thereof, with finder supporting frame 4b which supports focusing plate 22 and pentagonal prism 23. To the top of the front plate 4 is fixedly coupled a supporting plate 28 through pins 28a carried thereby. The supporting plate 28 has film rewinding member (24), film sensitivity setting member 25, shutter relase button 26 and shutter speed setting member 27 respectively mounted thereon in substantially the same manner as required to mount them on a camera body in conventional cameras. It is to be understood that the feature of the embodiment does not lie in each member per se nor the manner of mounting for an individual member, but lies in that the members are mounted on a supporting plate coupled with the front plate 4. At the back of the front plate 4 is arranged a mechanical release mechanism for mechanically initiating the exposure sequence in response to downward movement of release rod 26a which is effected by depression of release button 26. Self timer device 19 is also disposed at the back of the front plate 4. Further, on the front plate 4 and the supporting plate 28 are mounted, directly or indirectly, electric circuit means including a light measuring circuit, an exposure control circuit, a diaphragm control circuit, an exposure condition indicating circuit, an energizing circuit for the electromagnetic coil of the electromagnetic release mechanism, and so on, and a printed circuit for inter-connecting the circuit elements. Photoelectric element 33 is mounted on the top of pentagonal prism 23 to receive scene light through the camera objective, the diaphragm aperture, reflex mirror 18, focusing plate 22 and the pentagonal prism 23.

Mirror box 3 is fixed to the side surface of view finder supporting frame 4b and to the back surface of front plate 4, by three screws 34. Unitized shutter block 2 is fixed by three screws 35 to the rear wall of view finder supporting frame 28 at respective receiving portions 36 and 37, and to the back of front plate 4 at receiving portion 44 through connecting rod 38 which is carried by the shutter block 2, whereby the interconnection at the three points ensures parallelism of shutter blades 13 with respect to the reference plane for the attachment of the interchangeable lens, and the relative position of the shutter block 2 with respect to the front plate 4. The front plate 4 is to be fixed to main camera body 1 by four screws (39) at the receiving portion 40, 41, 42 and 43 of the body. It is to be noted that only three of screws 39 are shown in FIG. 3 but the rest is used behind the mirror box 3 in the FIG.

Figure 4:
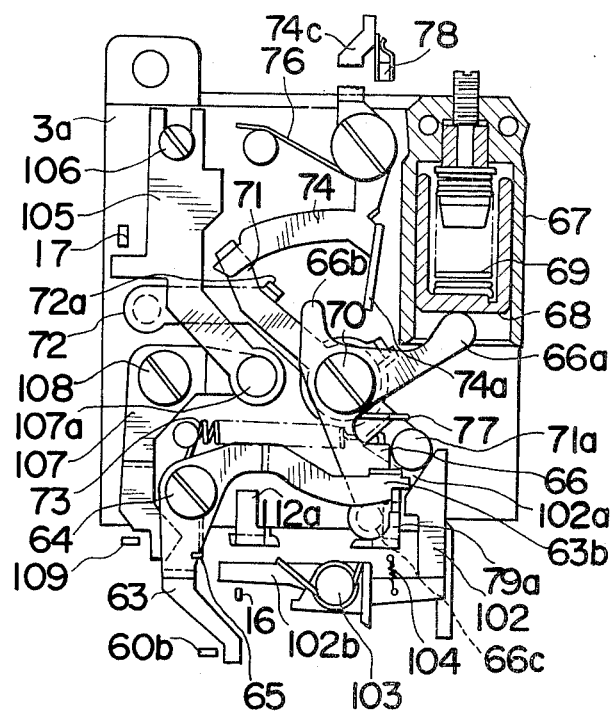
FIG. 4 is a side elevational view of the mirror box.
Figure 5:
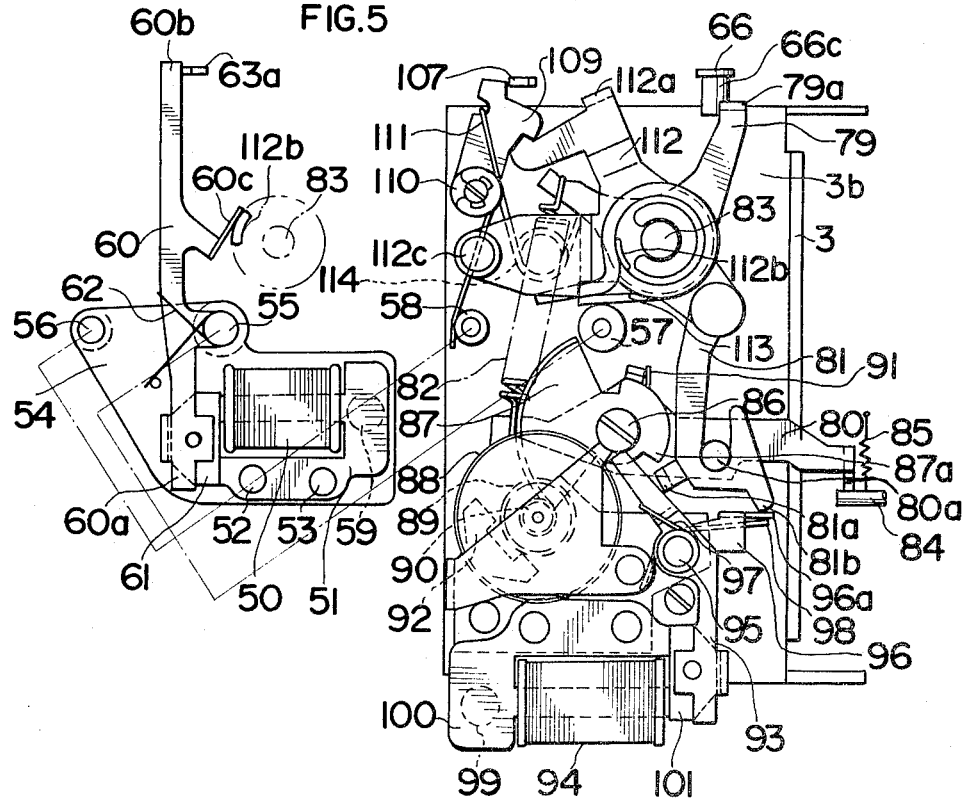
FIG. 5 is a bottom view of the mirror box.

Referring to FIGS. 4 and 5 respectively showing the mirror driving mechanism on the side wall of mirror box 3 and diaphragm driving mechanism 20 and electromagnetic release device 21 at the bottom of the mirror box 3, the electromagnetic release device includes electromagnet 50 having yoke 51 fixed to base plate 54 by screws 52 and 53, with the base plate 54 being secured to the bottom 3b of mirror box 3 at receiving portion 57 and 58 thereof. Permanent magnet 59 is fixedly mounted on the yoke 51 to produce a magnetic field through the yoke. Release lever 60, rockably mounted on pin 55, is provided at one end 60a thereof with armature 61 to be attracted to the magnetic pole of the yoke 51 and is urged by spring 62 clockwise as viewed in FIG. 5. Electromagnetic coil 50 is coiled around one arm of the yoke such that the electromagnetic coil 50, when energized in accordance with closure of the release switch (not shown), which is effected by depression of shutter button 26, produces a magnetic field opposite to the magnetic field of the permanent magnet 59 to offset or counterbalance the latter field and allows the release lever 60 to turn clockwise due to the force of spring 62. The release lever 60 is engageable, at its end 60b, with arm 63a of restraining lever 63 shown in FIG. 4.

Restraining lever 63 is pivoted on a side wall 3a of the mirror box through a pin 64 and is movable counterclockwise against the force of spring 65 by the release lever 60 upon operation of a shutter release button 26. An operating lever 66 engageable with restraining lever 63 has an arm 66a which is maintained in engagement with a vertically movable piston 68 of an air damper, which will be described in more detail below.

The air damper includes: a cylinder 67 which is rigidly secured to side wall 3a of the mirror box; the piston fitted in cylinder 67 and a drive spring 69 confined between the adjusting member at the top and the inner bottom wall of piston 68. This piston is given a tendency to be displaced downwards under the action of drive spring 69, while receiving a damping action due to the fluid resistance of air flowing through a peripheral gap between piston 68 and cylinder 67. A diaphragm operating lever 79 as shown in FIG. 5 is so loaded as to rotate counterclockwise under the action of a spring 82 to engage a pin 66c carried on operating lever 66. The diaphragm operating lever is however rotatably supported by a shaft 83 on a bottom wall 3b of the mirror box. A diaphragm aperture control member 80 is rotatably supported on bottom wall 3b. The diaphragm aperture control member has thereon a pin 80a which is in engagement, under the action of spring 82, with a hook portion 81b of a connecting lever 81, which in turn is linked at one end to diaphragm operating lever 79. Diaphragm aperture control member 80 has one arm which engages a diaphragm interlocking pin 84 extending from an interchangeable lens mounted on the camera body so as to operate the diaphragm in the interchangeable lens. The arm of diaphragm aperture control member 80 and diaphragm interlocking pin 84 are continuously in engagement with each other under the action of a spring 85 which is tensioned between the diaphragm interlocking pin 84 and a structure in the lens and by which a diaphragm is so spring-loaded as to move in a direction to be stopped down.

A sector gear 87 is so loaded as to rotate clockwise so as to bring its cam portion 87a into contact with a lug 81a of connecting lever 81 under the action of spring. An escape wheel 89 and ratchet wheel 88 are mounted on bottom wall 3b through the shaft common to and integral with a pinion 90 meshing with sector wheel 87. Ankle 92 is in engagement with escape wheel 89 to delay the rotation of the escape wheel, thereby forming delay means in combination.

In response to a balance signal generated by a diaphragm control circuit which compares set exposure factors with the output of a light measuring circuit (not shown) which measures light from an object to be photographed which has passed through the aforesaid diaphragm while being stopped down, an electromagnetic coil 94 for diaphragm (FIG. 5) is excited to thereby offset a magnetic force which has been produced by a permanent magnet 99 prior to the excitation of electromagnet 94. Diaphragm locking lever 93 is provided with an armature 101, whose attraction and separation to and from a magnetic pole are governed by magnetic forces of permanent magnet 99 and electromagnet 94 and by force of a spring 97. A lock pawl 93a, provided on one arm of diaphragm locking lever 93, is brought into engagement with a tooth of ratchet wheel 88 when armature 101 separates from the magnetic pole, thereby locking ratchet wheel 88, whereas the rotation of diaphragm preset member 80 and diaphragm interlocking pin 84 is stopped to determine a diaphragm aperture, whereupon the counterclockwise rotation of diaphragm operating lever 79 is also stopped.

Moreover, operating lever 66 is rotated clockwise at a speed decelerated by a delay mechanism consisting of an air damper, which is provided independently of the delay means consisting of ankle 92 and escape wheel 89, so that pin 66b of lever 66 will be shifted leftwards, as viewed in FIG. 5, faster than the rotation of diaphragm operating lever 79, and continue to shift in that direction independently of the rotation of diaphragm operation lever 79. As a result of the above-described rotation of operating lever 66 in the clockwise direction, an arm 66b of operating lever 66 is brought into engagement with angled piece 74a of a mirror restraining member 74. Mirror restraining member 74 is loaded to rotate clockwise under the action of a spring 76 and has a hook or pawl portion 74b, which is in engagement with a mirror driving member 71 which is loaded to rotate clockwise by the force of a spring 73. Mirror locking member 74 also has an arm 74c adapted to engage a movable contact of a memory switch 78 normally maintained open, thereby closing the switch, and to disengage from the movable contact of the memory switch due to the counterclockwise rotation of mirror locking member 74 to cause the memory switch to open. Disposed in engagement with mirror driving member 71 is a connecting lever 72, which is adapted to move a movable reflex mirror 8 of the single lens reflex camera to a photographing position retracted from a photographic light path, in association with the clockwise rotation of mirror driving member 71. Shutter release member 102, which is pivoted on a pin 103 and engages at one end 102a a pin 71a provided on mirror driving member 71 under the action of spring 104 is loaded to rotate counterclockwise by a spring force, so that the same can be urged counterclockwise to follow mirror driving member 71 rotating clockwise, thereby pushing with its arm 102b shutter restraining member 16 engaging therewith, whereby the shutter opening member in the shutter block 2 is released from the locked condition.

Simultaneously with the starting of the shutter opening member, information of a quantity of light from an object which has passed through the diaphragm aperture determined as explained above, is stored in a storing capacitor due to the opening of memory switch 78, and is applied to a shutter control circuit. After a lapse of time determined by the control circuit a rear curtain is actuated in a known manner by an output of the shutter control circuit whereby exposure is terminated.

A sliding plate 105 is slidably supported by a pin 106 on side wall 3a of the mirror box to engage a signal member 17 adapted to move downwards in association with the termination of exposure, i.e. closure of the shutter. The sliding plate is associated with an interlocking member 107 through pin 107a which is also supported by pin 108 on the side wall of the mirror box. Interlocking member 107 is engageable with a lock member 109 as best seen in FIG. 5. Lock member 109 is urged clockwise about pin 110 by the spring force 111 to engage its hook or pawl portion 109a with a pawl portion of a return-movement-actuating member 112a, which is supported on the bottom wall by pin 83 common to diaphragm operating lever 79. Thus, lock member 109 locks the return-movement-actuating member 112a and is loaded to rotate clockwise by the strong force of the combination of a return spring 113 wound around shaft 83 and an auxiliary return spring 114 confined between lock member 109 and return spring 113. Thus, when return-movement-actuating member 112a is released from lock member 109, the member 112a is rotated clockwise. During its movement, the return-movement-actuating member 112a engages diaphragm operating lever 79 rotating counterclockwise, thereby urging the same clockwise against the force of spring 82, and at the same time, urges pin 66b of operating lever 66 rightwards, which has been rotated clockwise as viewed in FIG. 4, whereby operating lever 66 forces piston 68 of the air damper upwards. Thus, operating lever 66 brings its projection 66c into engagement with pin 71a of mirror driving member 71, thereby urging the member 71 counterclockwise, so that mirror driving member 71 and operating lever 66 are locked by mirror lock member 74 and restraining lever 16, respectively. At the same time, diaphragm operating lever 79 is urged clockwise by pin 66b, so that projection 81c of connecting lever 81 pushes a projection 98 downwards, whereby lock lever 93 is rotated clockwise, to thereby disengage its pawl 93 from ratchet wheel 88, and at the same time, to bring armature 101 into engagement with the magnetic pole. As a result, sector gear 87 is allowed to rotate clockwise by the force of spring 91, and thus the conditions shown in FIGS. 4 and 5 are resumed.

Referring to FIG. 6, the main camera body 1 is formed with recess or well 1a at the bottom under and near the film chamber 115 which is adapted to receive a film cartridge. The recess 1a is adapted to receive a part 31a of electric circuit means 31, with electric conducting means printed on thin flexible synthetic resin film 32 being introduced or extended through a notch 1b. The notch 1b may be substituted by an opening formed on the bottom wall of the camera body so that the part of electric circuit 31a may be inserted into the recess 1a through the opening. In this case, however, the size of such opening is restricted or limited, because the middle portion of the bottom wall of the camera body where the opening is formed, is usually utilized for various purpose, for example, for receiving a battery. However, it is desirable that the portion 31a of the electric circuit means is as large as possible to occupy a substantial portion of the recess so that as many circuit elements as possible may be contained in the portion 31a. As a result, it is impossible to insert the portion 31a into the recess without separating the portion 31a from the conductor 32.

Figure 1:
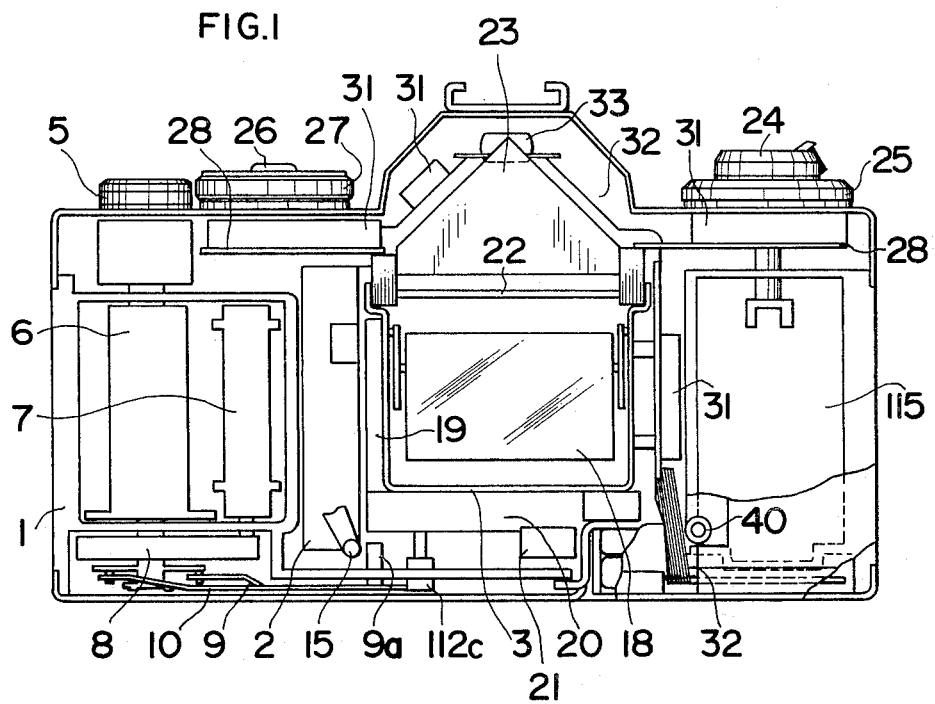
FIG. 1 is a front elevational view of the camera body.

In direct contradiction thereto, with the construction of the present embodiment, the portion 31a may be inserted into the recess 1a with the portion 31a being connected with the conductor 32 which extends by way of the front portion of the camera body as viewed in FIG. 1. It is to be understood that the portion 31a may be removed from the recess with the conductor 32 being connected to the portion, in case the camera is repaired.

It is to be noted that the camera of the present embodiment is so constructed that mechanical release device 29 and an electromagnetic release device may be selectively operated for initiating an exposure sequence. In case the mechanical release device is selected, a mechanical release member (not shown) acts on release lever 63 to release restraint on operating lever 66 by the release lever 63. In addition, the exposure control system is so constructed to effect a shutter speed priority diaphragm control mode wherein the diaphragm aperture is automatically determined in accordance with the set shutter speed, set film sensitivity and scene light measured by the photoelectric element 33 through the objective lens and the stopped-down diaphragm aperature. Information of the scene brightness measured through the determined aperture is stored immediately before actuation of the reflex mirror and the shutter speed is controlled in accordance with the stored information. The exposure control system effects a diaphragm aperture priority shutter control mode wherein the shutter speed or exposure time is controlled in accordance with the output signal representative of the exposure time suitable for the manually set diaphragm aperture, the set sensitivity and scene brightness measured through the objective lens. However, a detailed explanation of the diaphragm aperture priority mode is omitted in this specification, but an explanation of the operation of the mechanism will be made with reference to the shutter speed priority mode, because the exposure control system is not the main subject of the present invention.

The following explanation is directed to how to assemble and adjust the camera of the embodiment and the operation of the assembled camera.

First of all, to the mirror box 3 are mounted the mechanisms as shown in FIGS. 4 and 5, and also reflex mirror 18. Then, the mirror box 3 is secured to front plate 4 with screws 34 and supporting frame 28 is coupled to the plate 4. To the coupled frame 28 and plate 4 are attached film rewinding member 24, film sensitivity setting member 25, release button 26, shutter speed setting member 27, release rod 26a, shutter release device 29, self timer device 30, electric circuit means 31 and conductor 32. And to view finder supporting frame 4b is mounted focusing plate 22 and pentagonal prism 23. Then unitized shutter block 2 is secured to front plate 4 with screws 35 so that the shutter driving mechanism on shutter block 2 is coupled with the mirror driving mechanism and the diaphragm driving mechanism.

In this semi-assembled condition, shutter driving mechanism 14, the mirror driving mechanism and the diaphragm driving mechanism can be actuated by setting the front plate assembly on a suitable jig which has a charge mechanism operable substantially in the same manner as the charge mechanism in the camera body. In the present embodiment, the accuracy of the relative position of shutter block 2 and mirror box 3 depends on an accumulation of errors in their respective couplings with the front plate 4. However such accuracy is improved as compared with conventional cameras. Accordingly, an accurate interconnection is attained between interconnecting portions of the shutter driving mechanism, mirror driving mechanism and diaphragm driving mechanism, i.e. between restraining member 16 and shutter release member 102, and between shutter closing member 17 and operating plate 105. However, it is expected that an imperfect interconnection will occur in the subassemblage, due to an accumulation of errors of elements and parts even if individual errors are within permitted tolerances. In this case such an imperfect interconnection can be found and adjusted before the front plate 4 is assembled in the camera, by actuating the driving mechanisms on the jig. Thus, the extra space for ensuring operation is unnecessary.

Further, as the subassembled front plate is provided with electric circuit means 31 and conductor 32, the driving mechanism may be operated by the circuit means for the adjustment of the circuit elements. For example, the automatic shutter control system may be calibrated with an interchangeable lens being mounted on the front plate, the subassemblage being held in a light tight box and the lens being directed to a light source of given brightness so that the light from the source will impinge on the photoelectric element 33. It is to be noted that upon such calibration, the various setting means are set to given positions. The automatic diaphragm control system may also be calibrated in substantially the same manner. Further, the electromagnetic release mechanism may be checked by connecting an electric power source with the energizing circuit for the electromagnet.

Upon completion of all the checks and adjustment of the subassemblage, the front plate 4 may be removed from the jig and secured with screws 39 to the camera body to which have been mounted wind-up lever 5, film spool 6, sprocket 7, film advancing mechanism 8 cocking levers 9 and 10 and film counter 10.

Also, upon coupling of the front plate assemblage with the camera body, a portion 31a of electric circuit means 31 may be inserted into recess 1a with conductor 32 being extended over the front portion of the camera body and through notch 1b. After the front plate 4 is fixed to the camera body, the portion 31a of the circuit means may be fixed to the bottom wall of the body. If it becomes necessary to remove the front plate from the camera body, then the portion 31a may be removed beforehand.

When the camera has been fully assembled, the shutter, mirror and diaphragm driving mechanisms may be operated in the following manner.

In operation, when operating lever 66 is released from restraining lever 63 in accordance with the release operation, operating lever 66 is rotated counterclockwise, being subjected to a damping action by the air damper due to the downward displacement of the piston 68. The counterclockwise rotation of operating lever 66 disengages its pin 66b from diaphragm operating lever 79, thereby allowing diaphragm operating lever 79 to rotate counterclockwise as viewed in FIG. 5, as well as rotating diaphragm control member 80 clockwise, and hence diaphragm interlocking pin 84 counterclockwise, whereby the diaphragm is driven in a direction to be stopped-down. During the diaphragm stopping-down operation, the diaphragm is slowly stopped-down under a delay action due to the engagement of ankle 92 with sector wheel 89. The diaphragm operating lever 79 remains disengaged from pin 66b of operating lever 66 and hence the pin is not actuated. When the diaphragm is stopped-down to an optimum aperture relative to the brightness of an object and set exposure factors, electromagnet 94 is excited by the output of the diaphragm control circuit including a light receiving element receiving light from the object through the diaphragm during the diaphragm-stopping-down operation, and diaphragm locking lever 93 locks ratchet wheel 88 interlocking with diaphragm operating lever 79, whereby the diaphragm aperture is determined. The time from the release operation to the determination of a diaphragm aperture is the longest in the case where the diaphragm is stopped-down to a minimum aperture. Regardless of whether such time for determining an aperture value is long or short, operating lever 66 continues its clockwise rotation, and after a lapse of a given period of time, then the piston 68 pushes the lever and arm 66d of operating lever 66 disengages mirror operating member 71 from mirror lock member 105. Prior to this operation, mirror lock member 74 disengages arm end 74c from memory switch 78, thereby opening memory switch 78, and the information, of the brightness of an object, which has passed through the diaphragm aperture thus determined is stored in a memory element.

Mirror driving member 71 thus released from mirror lock member 105 is allowed to rotate clockwise to thereby turn a movable mirror from a viewing position in the photographic optical path to a picture-taking position retracted from the photographic optical path. At this time, the front curtain of the shutter is released from the locked condition so as to travel and initiate exposure, and then the rear curtain of the shutter starts travelling in timed relationship to information stored in the aforesaid memory element, whereby exposure commensurate with a determined diaphragm aperture is achieved.

In association with the termination of travelling of the rear curtain of the shutter, signal member 17 moves downwards and urges interlocking member 107 clockwise as viewed in FIG. 4 (leftwards in FIG. 5), through the medium of sliding plate 105.

As a consequence, return-movement-actuating member 112a supported on the shaft 83 common to diaphragm operating lever 79 is rotated clockwise by the strong forces of return spring 113 and auxiliary return spring 114. During the rotation in that direction, return-movement-actuating member 112a urges rightwards pin 66b of operating lever 66 which has been shifted leftwards in FIG. 4, and rotates diaphragm operating lever 79 clockwise, which lever had been rotated counterclockwise and stopped midway in its rotation at that time.

Consequently, drive spring in air damper 5 is loaded, diaphragm aperture control member 80 turns the diaphragm to its full open position, and projection 81c of connecting lever 81 rotates diaphragm lock lever clockwise, thereby bringing armature 101 into contact with the magnetic pawl, as well as disengaging its lock pawl 93 from ratchet wheel 88, whereby sector wheel 87 becomes free to rotate clockwise. Thus, operating lever 66 is locked by restraining lever 63 in the position shown in FIG. 4, and mirror driving member 71 is locked by mirror lock member 74, whereby the movable mirror resumes its viewing position.

Then, when wind up lever 5 is operated, film spool 6 and sprocket 7 are rotated by film advancing device 8 to wind up film around the film spool, with film counter 11 being advanced to indicate the next film frame number. At the same time, cocking levers 9 and 10 are moved respectively to the left and right as viewed in FIG. 1, so that charging member 15 engaged by pin 9a cocks shutter driving mechanism 14, while return-movement-operating lever 112, engaged by cocking lever 10 through pin 112c, rotates counterclockwise. As a result, springs 113 and 114 are charged and the lever 112 is restrained by restraining lever 109 at the cocked position thereof. Due to the cocking of the shutter driving mechanism, shutter restraining member 16 restrains shutter opening member (not shown) at the cocked position thereof, while shutter closure signal member 17 returns upward as viewed in FIG. 4 and is restrained at the cocked position thereof by a restraining member (not shown). Returning of the signal member 17 returns operating plate 105 upwards due to the force of a spring not shown, and restraint-release lever 107 rotates counterclockwise to allow restraining lever 109 to restrain return-movement-operating lever 112. Thus, all the elements resume the initial positions as shown in FIGS. 4 and 5.

While a preferred embodiment of the present invention has been described above, the present invention should not be restricted to that which has been described, but various modifications and variations may be drived therefrom without departing from the concept or spirit of the invention as will be defined by the following claims. For example, mirror box 3 may be formed integrally with the front plate of the aluminum diecast.

Further, the driving mechanisms may be so constructed that small gaps occur between delaying lever 66 and release lever 63 and between mirror driving lever 71 and restraining lever 71, ensuring restraint of delaying lever 66 and mirror driving lever 71 by release lever 63 and restraining lever 74 such that the levers 66 and 71 are allowed to turn clockwise in that gap when return movement operating lever 112 rotates counterclockwise and when delay lever rotates a little clockwise during the release operation.

We claim:

1. A single lens reflex camera comprising:
a camera body;
a shutter block including a base plate, a shutter mechanism and a shutter control mechanism mounted as a unit on said base plate;
a lens supporting structure formed with a mounting for the camera objective including a diaphragm mechanism;
a mirror box including a reflex mirror and a mirror driving mechanism mounted therein;
a diaphragm control means including a movable member to be interlocked with said diaphragm mechanism for controlling the latter as a function thereof;
a photoresponsive element for generating an output in accordance with scene light;
means for actuating said movable member;
means for determining the position of said movable member as a function of the output of said photoresponsive element;
said shutter block, lens supporting structure, mirror box and diaphragm control means forming a subassembly in which said shutter control mechanism, said morror driving mechanism, said movable member, means for actuating and means for determining are operatively interconnected with one another to perform a predetermined sequential operation and enabling independent adjustment thereof; and
said sub-assembly being attached to the camera body.

2. A single lens reflex camera as in claim 1 wherein said mirror box is integrally coupled with said lens supporting structure.

3. A single lens reflex camera as in claim 3 further comprising a focusing plate and pentagonal prism, and wherein said intregral assembly of said mirror box and lens supporting structure includes a viewfinder supporting frame for supporting said focusing plate and said pentagonal prism, and said photoresponsive element is mounted on said pentagonal prism.

4. A single lens reflex camera as in claim 1 wherein said sub-assembly includes an electromagnetic means for initiating said predetermined sequential operation in response to a manual operation.

5. A single lens reflex camera comprising:
a camera body;
a shutter block including a base plate, a shutter mechanism and a shutter actuating and controlling mechanism mounted as a unit on said base plate;
a lens supporting structure formed with a mounting for the camera objective including a diaphragm mechanism;
a mirror box integral with said lens supporting structure and including a reflex mirror and mirror driving mechanism, said lens supporting structure and mirror box forming a sub-assembly;
diaphragm control means mounted on said sub-assembly;
said reflex mirror, mirror driving mechanism and diaphragm control means being interrelated with said shutter actuating and controlling mechanism to operate in a timed relationship with one another;
said mirror driving mechanism and said diaphragm control means being operatively interconnected to operate in a predetermined sequence indepedently of any other elements included in said camera body to which said sub-assembly is attached;
said diaphragm control means including a movable member adapted to be coupled with said diaphragm mechanism for controlling the latter as a function of the position thereof;
photoresponsive means for generating an output according to scene light; and
means for determining the position of said movable member in accordance with said output.

* * * * *

UNITED STATES PATENT OFFICE
CERTIFICATE OF CORRECTION

PATENT NO. : 4,260,232
DATED : April 7, 1981
INVENTOR(S) : UEDA ET AL

It is certified that error appears in the above-identified patent and that said Letters Patent are hereby corrected as shown below:

On the title page add Item [30]:
-- [30] Foreign Application Priority Data

December 27, 1976   Japan......... Appl'n No. 51-160372 --

Signed and Sealed this

*Twenty-third* Day of *March 1982*

[SEAL]

*Attest:*

GERALD J. MOSSINGHOFF

*Attesting Officer*     *Commissioner of Patents and Trademarks*